(12) United States Patent
Takeuchi

(10) Patent No.: US 10,287,406 B2
(45) Date of Patent: May 14, 2019

(54) ELECTRICALLY CONDUCTIVE MEMBER

(71) Applicant: POLYMATECH JAPAN CO., LTD., Saitama (JP)

(72) Inventor: Akihito Takeuchi, Saitama (JP)

(73) Assignee: POLYMATECH JAPAN CO., LTD., Saitama (JP)

(*) Notice: Subject to any disclaimer, the term of this patent is extended or adjusted under 35 U.S.C. 154(b) by 0 days.

(21) Appl. No.: 15/573,179

(22) PCT Filed: Jun. 26, 2015

(86) PCT No.: PCT/JP2015/068495
§ 371 (c)(1),
(2) Date: Nov. 10, 2017

(87) PCT Pub. No.: WO2016/208059
PCT Pub. Date: Dec. 29, 2016

(65) Prior Publication Data
US 2018/0100045 A1    Apr. 12, 2018

(51) Int. Cl.
| | | |
|---|---|---|
| *C08J 5/08* | (2006.01) | |
| *C08K 7/14* | (2006.01) | |
| *C08K 9/02* | (2006.01) | |
| *C08K 3/04* | (2006.01) | |
| *C08J 5/10* | (2006.01) | |
| *H01B 1/20* | (2006.01) | |
| *C08L 21/00* | (2006.01) | |
| *C08K 7/02* | (2006.01) | |

(52) U.S. Cl.
CPC . *C08J 5/08* (2013.01); *C08J 5/10* (2013.01); *C08K 3/04* (2013.01); *C08K 7/14* (2013.01); *C08K 9/02* (2013.01); *C08L 21/00* (2013.01); *H01B 1/20* (2013.01); *C08J 2383/04* (2013.01); *C08K 7/02* (2013.01); *C08K 2201/001* (2013.01)

(58) Field of Classification Search
None
See application file for complete search history.

(56) References Cited

U.S. PATENT DOCUMENTS

| | | |
|---|---|---|
| 2004/0135129 A1 | 1/2004 | Hattori et al. |
| 2005/0004269 A1 | 1/2005 | Kakegawa |

FOREIGN PATENT DOCUMENTS

| | | | |
|---|---|---|---|
| CN | 1332769 A | 1/2002 | |
| CN | 1475865 A | 2/2004 | |
| CN | 102010600 A | 4/2011 | |
| CN | 102153869 A | 8/2011 | |
| EP | 2775483 A1 * | 9/2014 | ............... H01B 1/22 |
| JP | 55-108455 A | 8/1980 | |
| JP | 4-238952 A | 8/1992 | |
| JP | 6-816 A | 1/1994 | |
| JP | 2006-152207 A | 6/2006 | |

OTHER PUBLICATIONS

Trans of CN 102153869 dated Aug. 2011 (Year: 2011).*
International Search Report and Written Opinion for PCT Patent App. No. PCT/JP2015/068495 dated Oct. 6, 2015 with English translation of the ISR.
Office Action from Chinese Patent App. No. 201580079302.5 dated Jan. 8, 2019.

* cited by examiner

*Primary Examiner* — Tanisha Diggs
(74) *Attorney, Agent, or Firm* — Cermak Nakajima & McGowan LLP; Tomoko Nakajima

(57) ABSTRACT

Provided is an electrically conductive member, comprising: a matrix including a rubber-like elastic body; electrically conductive fiber; a coloring pigment, which has low resistance, a desired color tone, and flexibility. The electrically conductive member has a percentage of the coloring pigment of 2.5 to 11.0 vol % relative to the total of the electrically conductive fiber and the coloring pigment, and a percentage of the total of the electrically conductive fiber and the coloring pigment of 25 to 33 vol % relative to the entire electrically conductive member.

3 Claims, 4 Drawing Sheets

ELECTRICALLY CONDUCTIVE MEMBER

This application is a national phase entry under 35 U.S.C. § 371 of PCT Patent Application No. PCT/JP2015/068495, filed on Jun. 26, 2015, which is incorporated by reference.

BACKGROUND OF THE INVENTION

Field of the Invention

The present invention relates to a flexible, low-resistance, and colored electrically conductive member.

Related Art

In general, an electrically conductive member is highly loaded with an electrically conductive powder having an intrinsic color tone. Therefore, the color tone of the electrically conductive member is determined by the color tone of the electrically conductive powder to be contained. The color tone of an electrically conductive member has not been an issue because it has been used as a functional component. In recent years, designability is, however, required even for a functional component. In view of the above circumstances, an electrically conductive member having a desired color tone which can be used for a current-conductive connection has been demanded. In response to this demand, attempts have been tried for painting or printing the outer surface of an electrically conductive member in color to achieve a particular color appearance. However, a color layer formed by painting or printing often has insulating properties, and thus can not be used to cover a portion where a current-conductive contact with a connection target is required. Therefore, there has been a limitation on achieving a desired color appearance of an electrically conductive member.

Japanese Unexamined Patent Application Publication No. H4-238952 as a Patent Document discloses electrically conductive color particles in which electrically conductive fiber having a fiber diameter of 0.001 to 1 mm and a fiber length of 0.1 to 10 mm and a coloring agent are blended in a thermoplastic resin. The above electrically conductive color particles are further added in an amount of 1 wt % or 2 wt % or more to a synthetic resin, and then used as an electrically conductive sheet for a floor material or a wall material. Further, Example in the Patent Document describes that the above electrically conductive sheet has electrical conduction of $10^4$ to $10^6$ $\Omega$.

CITATION LIST

Patent Literature

Patent Document 1: Japanese Unexamined Patent Application Publication No. H4-238952

SUMMARY OF THE INVENTION

According to the technology described in the above Patent Document, an electrically conductive sheet having electrical conduction of about $10^4$ to $10^6$ $\Omega$ and colored to some extent can be obtained. However, when trying to achieve a resistance value as low as several $\Omega$s or less for use in grounding and current-conduction in an electronic device in addition to those uses as described above, a large amount of electrically conductive fiber needs to be blended, decreasing the relative amount of a coloring agent. Disadvantageously, this makes the color tone of the resulting product to be dominated by that of the electrically conductive fiber.

The present invention is made in view of the above problems. That is, an object of the present invention is to provide an electrically conductive member which is low in resistance, but still colored in a desired color tone, and further highly flexible.

An embodiment of the electrically conductive member according to the present invention for achieving the above object is configured as follows. That is, provided is an electrically conductive member comprising: a matrix including a rubber-like elastic body; electrically conductive fiber; and a color pigment, in which the percentage of the coloring pigment is 2.5 to 11.0 vol % relative to the total of the electrically conductive fiber and the coloring pigment, and the percentage of the total of the electrically conductive fiber and the coloring pigment is 25 to 33 vol % relative to the entire electrically conductive member.

When the percentage of the electrically conductive fiber is increased to obtain an electrically conductive member having low resistance, the percentage of the coloring pigment needs to be increased proportionally in order to obtain a desired color tone. However, inclusion of a large amount of the coloring pigment tends to increase resistance, and even impair the flexibility of the electrically conductive member. Surprisingly, the present inventors have found that the requirements of the apparently incompatible properties of low resistance, a desired color tone, and flexibility can be satisfied when the percentage of the color pigment is 2.5 to 11.0 vol % relative to the total of the electrically conductive fiber and the color pigment, and the percentage of the total of the electrically conductive fiber and the coloring pigment is 25 to 33 vol % relative to the entire electrically conductive member.

Further, provided is the electrically conductive member having a volume resistivity of 2 $\Omega$·cm or less, and an A hardness of A40 or less as measured with a type A hardness meter in accordance with Japanese Industrial Standard JIS K6253, and a color difference $\Delta E$ of 30 or less, the color difference $\Delta E$ being against an ideally colored member formed with the coloring pigment and the matrix with the electrically conductive fiber excluded from the electrically conductive member.

The above electrically conductive member can be used for the purpose of grounding in an electronic device because it has a volume resistivity of 2 $\Omega$·cm or less. The above electrically conductive member has an A hardness of A40 or less as measured with a type A hardness meter in accordance with Japanese Industrial Standard JIS K6253. This allows it to be flexible enough for conforming to the unevenness of a connection target. Moreover, the color difference $\Delta E$ is 30 or less, the color difference $\Delta E$ being against an ideally colored member formed with the coloring pigment and the matrix with the electrically conductive fiber excluded from the electrically conductive member. This indicates that an electrically conductive member having a color tone of the coloring pigment in which the color tone of the electrically conductive fiber is concealed can be obtained.

Further, provided is the electrically conductive member, in which the percentage of the color pigment is 2.5 to 3.0 vol % relative to the total of the electrically conductive fiber and the color pigment, and the volume resistivity is 0.5 $\Omega$·cm or less.

The percentage of the coloring pigment is 2.5 to 3.0 vol % relative to the total of the electrically conductive fiber and the coloring pigment, and the volume resistivity is 0.5 $\Omega$·cm or less. This allows for lower resistance and higher current-conduction between connection targets.

Furthermore, provided is the electrically conductive member, in which the matrix is silicone rubber, and the electrically conductive fiber is metal-coated fiber, and the color pigment is carbon black.

The matrix is silicone rubber, and the electrically conductive fiber is metal-coated fiber, and the coloring pigment is carbon black. This enables an electrically conductive member having high durability, good dispersibility, and an excellent color tone to be obtained.

An embodiment of the electrically conductive member according to the present invention has low resistance, a predetermined color tone, and flexibility.

DESCRIPTION OF PREFERRED EMBODIMENTS

Figure 1:
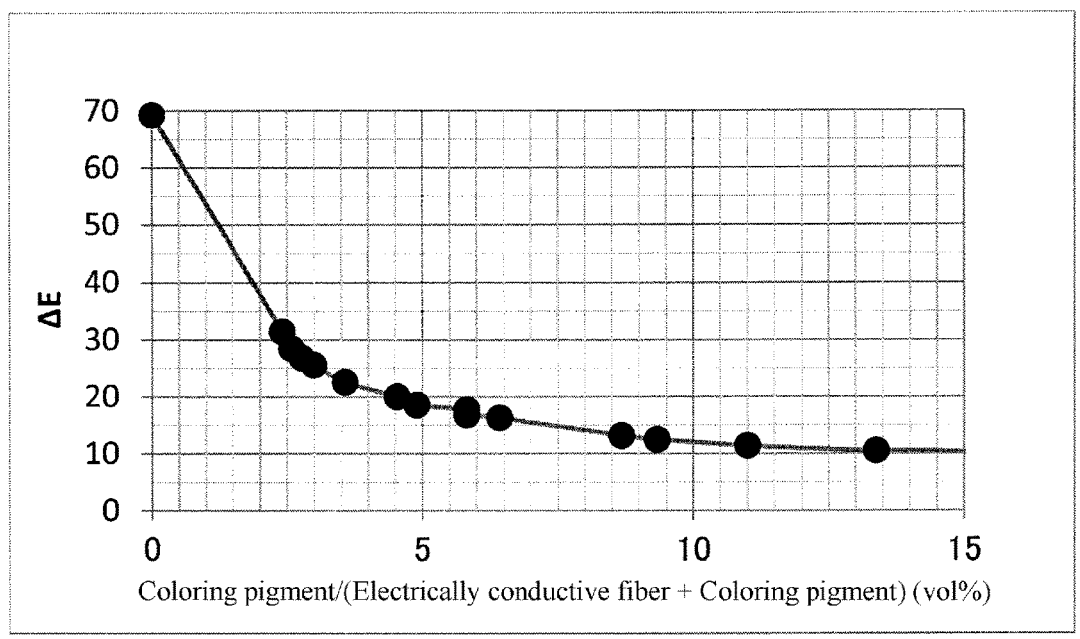
FIG. 1 is a graph showing the relationship between the content percentage of a color pigment relative to the total of electrically conductive fiber and the color pigment and ΔE.

The electrically conductive member according to the present invention will be described with reference to embodiments. The electrically conductive member is a mixture composition containing a matrix including a rubber-like elastic body, electrically conductive fiber, and a color pigment each in a predetermined amount.

The matrix is a component for supporting the electrically conductive fiber and the color pigment and conferring flexibility, and includes a rubber-like elastic body such as rubber, elastomer, and the like. The electrically conductive member is pressed between two connection targets such as between a substrate or an element and a housing of an electronic device where current-conduction is desired so as to conform and curve along the outer shape of the connection targets, allowing the electrically conductive member to make close contact with the connection targets. This enables a low resistance current-conductive connection between the two connection targets. Therefore, the matrix needs to confer such a desired flexibility on the electrically conductive member. With regard to the flexibility, followability is required for allowing the electrically conductive member to make close contact with the unevenness of connection targets if any. In terms of hardness, the electrically conductive member preferably has an A hardness of A10 to A50 as defined by JIS K6253. When the hardness is less than A10, the strength may be low, resulting in decreased durability. On the other hand, when the hardness is more than A50, an electrically conductive member after prepared by mixing electrically conductive fiber and a color pigment may be too hard, and may not conform to the unevenness of connection targets.

The matrix preferably has such flexibility, and is preferably made of a material having breakage resistance even after repeated use. Specific examples thereof include cross-linked rubber such as natural rubber, acrylic rubber, butadiene rubber, isoprene rubber, styrene-butadiene copolymer rubber, nitrile rubber, hydrogenated nitrile rubber, chloroprene rubber, ethylene-propylene copolymer rubber, chlorinated polyethylene rubber, chlorosulfonated polyethylene rubber, butyl rubber, halogenated butyl rubber, fluoro-rubber, urethane rubber, and silicone rubber; and thermoplastic elastomer such as styrene-butadiene block copolymer and hydrogenated polymer thereof, styrene-isoprene block copolymer and hydrogenated polymer thereof, styrene-based thermoplastic elastomer, olefin-based thermoplastic elastomer, vinyl chloride-based thermoplastic elastomer, polyester-based thermoplastic elastomer, polyurethane-based thermoplastic elastomer, and polyamide-based thermoplastic elastomer. Among these, silicone rubber is suitable in view of thermal resistance and weather resistance. Alternatively, polyurethane resin is suitable in view of durability and flexibility.

The electrically conductive fiber is a filler which confers a predetermined electrical conduction as described below on an electrically conductive member, and preferably made of a material having an intrinsic specific resistance of 300 nΩ·m or less in order to contribute to grounding and current-conduction between two connection targets. As an example, the specific resistances of silver, copper, nickel, tin, stainless steel (SUS304), and carbon (graphite) are 15.9 nΩ·m, 16.8 nΩ·m, 69.3 nΩ·m, 115 nΩ·m, 720 nΩ·m, and 16.4 μΩ·m, respectively.

Examples of such electrically conductive fiber include metal fiber, metal-coated ceramic or resin fiber, and the like. As a metal having a specific resistance of 300 nΩ·m or less, metals such as gold, silver, platinum, nickel, copper, palladium, cobalt, chromium, and tin; and alloys such as brass and albata are preferably used. Among these, silver fiber, gold-plated fiber, silver-plated fiber, and the like are suitable as fiber having particularly good weather resistance and low resistance. It is noted that a material such as graphite and carbon, which is somewhat electrically conductive, is not suitable because they do not have a desired degree of electrical conduction.

A magnetic electrical conductor can also be used as the above conductive fiber. When such a magnetic electrical conductor is used, electrically conductive fiber can be concentrated at a desired location by taking advantage of a magnetic field. Specifically, a magnet is positioned in a mold opposite to a portion corresponding to a contact point when molding an electrically conductive member. This enables electrically conductive fiber to be oriented along the line of magnetic force arising between contact points. In the electrical conductive member molded in this way, the electrically conductive fiber is concentrated at contact points. Therefore, the color tone of a coloring pigment can be emphasized at a portion other than the contact points although the color tone of the electrically conductive fiber is somewhat strongly seen at the contact points. Further, the amount of electrically conductive fiber to be added for obtaining a desired electrical conduction can be further decreased to obtain a low-resistance but yet soft electrically conductive member.

Commonly used pigments can be used as the coloring pigment. Examples the coloring pigment include carbon black as a black pigment, titanium oxide as a white pigment, and other various organic and inorganic pigments having various color tones. Among these coloring pigments, carbon black is preferred because it has a color which can easily conceal the color tone of electrically conductive fiber.

Components other than the electrically conductive fiber and the coloring pigment may be included in an electrically conductive member within a range where effects on a color tone and electrical conduction can be controlled to a low level, in other words, as long as electrical conduction, a color tone, and flexibility required for the electrically conductive member can be achieved. Such components can include, for example, non-fibrous electrically conductive powders.

The content of a coloring pigment preferably accounts for 2.5 to 11.0 vol % of the total of electrically conductive fiber and the coloring pigment. This is because a desired color tone and a resistance value can be achieved when the percentage of a coloring pigment is 2.5 to 11.0 vol % relative to the total of electrically conductive fiber and the coloring pigment. When the percentage of a coloring pigment is less than 2.5 vol %, the color tone of electrically conductive fiber cannot be sufficiently concealed, and a desired color tone may be difficult to be obtained. On the other hand, when it is more than 11.0 vol %, electrical conduction may be impaired, and low resistance may be difficult to be obtained.

Moreover, the percentage of the total of electrically conductive fiber and a coloring pigment is preferably 25 to 33 vol % relative to the entire electrically conductive member. This is because a percentage of 25 to 33 vol % can allow for a desired electrical conduction while maintaining the flexibility of the resulting electrically conductive member. When the content of the total of electrically conductive fiber and a coloring pigment is less than 25 vol %, sufficiently low resistance is difficult to be achieved. When it is more than 33 vol %, the resulting electrically conductive member may be too hard.

It is noted that electrically conductive fiber is known to give predetermined electrical conduction generally at a relatively small loading amount of about 5 to 20 vol % relative to the entire electrically conductive member. However, that predetermined electrical conduction was not able be obtained when combined with a coloring pigment. Therefore, studies were required about the relationship between the percentage of a coloring pigment and electrically conductive fiber and resistance. After conducting extensive studies, the present inventors have found that when an electrically conductive member formed with the above predetermined components at the above predetermined percentages can have a volume resistivity of 2 Ω·m or less and a hardness of A40 or less. Moreover, with regard to the color tone thereof, a color difference ΔE of 30 or less can be achieved against an ideally colored member formed with a coloring pigment and a matrix without electrically conductive fiber. Such an electrically conductive member can be suitably used for the purpose of grounding between two connection targets when the electrically conductive member is molded into a desired size and a shape depending on an electronic device of interest, and incorporated into the electronic device, and pressed and contacted between the two connection targets such as between a substrate or an element and a housing of the electronic device.

EXAMPLE

Next, the present invention is described based on Example.

Sample 1: 100 mass parts of silver-coated glass fiber (silver content: 15 mass %, specific gravity: 2.92, fiber diameter: 12 μm, and mean fiber length: 50 μm) as electrically conductive fiber, and 5 mass % of a coloring paste containing a coloring pigment (including 55 mass % of carbon black as a coloring pigment, the remainder being silicone oil) were mixed with 100 mass parts of millable silicone rubber (A hardness: 15, specific gravity: 1.04) to obtain an electrically conductive composition. Next, a cylindrical test piece A having a diameter of 5 mm and a height of 3 mm, and a test piece B having dimensions of 30 mm×30 mm×6 mm were molded from the above electrically conductive composition in a mold. These are referred to as Sample 1, and the composition thereof is also shown in Table 1.

Samples 2 to 16: a test piece A and a test piece B were formed as in Sample 1 except that the composition of the electrically conductive fiber and the coloring paste was changed to the amounts as shown in Table 1. These are referred to as Samples 2 to 16, and the compositions thereof are shown in Table 1 or 2.

TABLE 1

|  |  | Sample 1 | Sample 2 | Sample 3 | Sample 4 | Sample 5 | Sample 6 | Sample 7 | Sample 8 |
|---|---|---|---|---|---|---|---|---|---|
| Matrix | part by mass | 100 | 100 | 100 | 100 | 100 | 100 | 100 | 100 |
| Electrically conductive fiber | part by mass | 100 | 100 | 100 | 100 | 80 | 90 | 120 | 120 |
| Coloring paste | part by mass | 5 | 2 | 3 | 10 | 4 | 5 | 3 | 5 |
| Matrix | vol % | 73.3 | 73.6 | 73.5 | 72.8 | 77.3 | 75.2 | 69.9 | 69.7 |
| Electrically conductive fiber | vol % | 25.5 | 25.9 | 25.8 | 24.8 | 21.6 | 23.5 | 29.4 | 29.1 |
| Coloring pigment | vol % | 1.6 | 0.6 | 1.0 | 3.1 | 1.3 | 1.6 | 0.9 | 1.5 |
| Electrically conductive fiber + coloring pigment | vol % | 27.0 | 26.6 | 26.7 | 27.8 | 22.9 | 25.1 | 30.3 | 30.6 |
| Pigment/(electrically conductive fiber + coloring pigment) | vol % | 5.8 | 2.4 | 3.6 | 11.0 | 5.8 | 6.4 | 3.0 | 4.9 |
| A hardness |  | 29 | 28 | 28 | 33 | 23 | 25 | 34 | 34 |
| Evaluation of hardness |  | ○ | ○ | ○ | ○ | ○ | ○ | ○ | ○ |
| Volume resistivity | Ω · cm | 0.99 | 0.5 | 0.52 | 2.0 | 4.3 | 1.8 | 0.15 | 0.79 |
| Evaluation of resistance |  | ○ | ◎ | ○ | ○ | X | ○ | ◎ | ○ |
| Chromaticity | L* | 41.5 | 54.5 | 45.8 | 35.7 | 40.5 | 40.1 | 48.6 | 42.1 |
|  | a* | 0.92 | 0.63 | 0.73 | 1.24 | 0.91 | 0.99 | 0.7 | 0.81 |
|  | b* | 1.11 | 5.5 | 3.41 | −1.42 | 1.1 | 0.72 | 4.48 | 1.78 |

TABLE 1-continued

|  | Sample 1 | Sample 2 | Sample 3 | Sample 4 | Sample 5 | Sample 6 | Sample 7 | Sample 8 |
|---|---|---|---|---|---|---|---|---|
| Rate of change in ΔE | 17.7 | 31.4 | 22.6 | 11.4 | 16.8 | 16.3 | 25.6 | 18.5 |
| Evaluation of chromaticity | ○ | X | ○ | ○ | ○ | ○ | ○ | ○ |
| Overall evaluation | ○ | X | ○ | ○ | X | ○ | ◎ | ○ |

<Measurement and Evaluation of Chromaticity>

TABLE 2

|  |  | Sample 9 | Sample 10 | Sample 11 | Sample 12 | Sample 13 | Sample 14 | Sample 15 | Sample 16 |
|---|---|---|---|---|---|---|---|---|---|
| Matrix | part by mass | 100 | 100 | 100 | 100 | 100 | 100 | 100 | 100 |
| Electrically conductive fiber | part by mass | 120 | 120 | 130 | 130 | 130 | 140 | 0 | 120 |
| Coloring paste | part by mass | 10 | 15 | 3 | 5 | 10 | 3 | 3 | 0 |
| Matrix | vol % | 69.4 | 69.0 | 68.2 | 68.1 | 67.8 | 66.6 | 99.0 | 70.1 |
| Electrically conductive fiber | vol % | 28.3 | 27.6 | 31.1 | 30.8 | 30.0 | 32.7 | 0.0 | 29.9 |
| Coloring pigment | vol % | 2.9 | 4.3 | 0.9 | 1.5 | 2.8 | 0.9 | 1.3 | 0.0 |
| Electrically conductive fiber + coloring pigment | vol % | 31.2 | 31.8 | 32.0 | 32.2 | 32.8 | 33.6 | 1.3 | 29.9 |
| Pigment/(electrically conductive fiber + coloring pigment) | vol % | 9.3 | 13.4 | 2.8 | 4.5 | 8.7 | 2.6 | 100 | 0 |
| A hardness |  | 38 | 38 | 37 | 39 | 40 | 43 | 14 | 33 |
| Evaluation of hardness |  | ○ | ○ | ○ | ○ | ○ | X | ○ | ○ |
| Volume resistivity | Ω·cm | 1.0 | 10.4 | 0.15 | 0.85 | 1.0 | 0.15 | O.L. | 0.13 |
| Evaluation of resistance |  | ○ | X | ◎ | ○ | ○ | ◎ | X | ◎ |
| Chromaticity | L* | 36.8 | 34.8 | 49.8 | 43.5 | 37.4 | 51.5 | 25.1 | 92.4 |
|  | a* | 1.16 | 1.31 | 0.66 | 0.8 | 1.12 | 0.65 | 2.38 | 0.51 |
|  | b* | -1.32 | -1.58 | 4.93 | 2.29 | -0.99 | 5.08 | -5.37 | 10.74 |
| Rate of change in ΔE |  | 12.5 | 10.5 | 26.8 | 20.0 | 13.1 | 28.5 | 0 | 69.2 |
| Evaluation of chromaticity |  | ○ | ○ | ○ | ○ | ○ | ○ | ○ | X |
| Overall evaluation |  | ○ | X | ◎ | ○ | ○ | X | X | X |

Tables 1 and 2 in the above show the measurement results and evaluation thereof about the volume resistivity, hardness (A hardness), and chromaticity for each sample as measured in accordance with the following methods, and the content percentage by volume of each component, the content percentage by volume of the total of the electrically conductive fiber and the coloring pigment in the electrically conductive member, and the content percentage by volume of the coloring pigment relative to the total of the electrically conductive fiber and the coloring pigment.

<Measurement and Evaluation of Hardness>

The test piece B of each sample was measured for the A hardness using a type A durometer. Results are shown in Table 1. The measurement results were categorized into hardness of A40 or less as "○" and hardness of more than A40 as "×".

<Measurement and Evaluation of Volume Resistivity>

The test piece A of each sample was sandwiched between a pair of electrodes, and subjected to 10% compression, and then a value of resistance was measured by a tester. The volume resistivity of each sample was calculated from that value of resistance. It is noted that the dimensions of a sample at the time of measurement was calculated as a cylinder having a diameter of 5 mm and a height of 2.7 mm.

The measurement results were categorized into volume resistivity of 0.5 Ω·cm or less as "◎," volume resistivity of more than 0.5 Ω·cm and 2.0 Ω·cm or less as "○", and volume resistivity of more than 2.0 Ω·cm as "×".

The test piece B of each sample was measured for chromaticity in the color space CIE1976 (L*, a*, b*) defined by the International Commission on Illumination using a hand-held spectrocolorimeter ("JX777" from Color Techno System Corporation).

Subsequently, Sample 15 which was formed with the coloring pigment and the matrix, but did not include the electrically conductive fiber was used as an ideally colored member which had the reference color. Then, the color difference ΔE between the chromaticity of Sample 15 and that of each sample was calculated based on the following expression (1). In the expression (1), $(L_0^*, a_0^*, b_0^*)$ represents the chromaticity of Sample 15, and (L*, a*, b*) represents the chromaticity of each sample.

$$\Delta E = ((L_0^* - L^*)^2 + (a_0^* - a^*)^2 + (b_0^* - b^*)^2)^{0.5} \quad \text{Expression (1)}$$

Then, values of ΔE were categorized into values of 30 or less as "○" and values of more than 30 as "×".

<Overall Evaluation>

Samples having at least one "×" in terms of evaluations of hardness, volume resistivity, and chromaticity were evaluated as "×", while those having no "×" were evaluated as "○". Further, among the samples having no "×", those having particularly excellent volume resistivity which was evaluated as "◎" were referred to as those having overall evaluation of "◎". It is noted that when the test pieces A of the samples having overall evaluation of "◎" or "○" were used as a grounding member between substrates, a good grounding effect was able to be obtained.

<Analysis of Evaluation Results>

FIG. 1 shows a graph where "coloring pigment/(electrically conductive fiber+coloring pigment)" (vol %) in the horizontal axis and ΔE calculated by the above Expression (1) in the vertical axis were plotted for each sample.

FIG. 1 shows that ΔE is 30 or less when "coloring pigment/(electrically conductive fiber+coloring pigment)" is 2.5 vol % or more, and ΔE is 20 or less when "coloring pigment/(electrically conductive fiber+coloring pigment)" is 4.5 vol % or more. This shows that "coloring pigment/(electrically conductive fiber+coloring pigment)" is preferably 2.5 vol % or more, more preferably 4.5 vol % or more.

Figure 2:
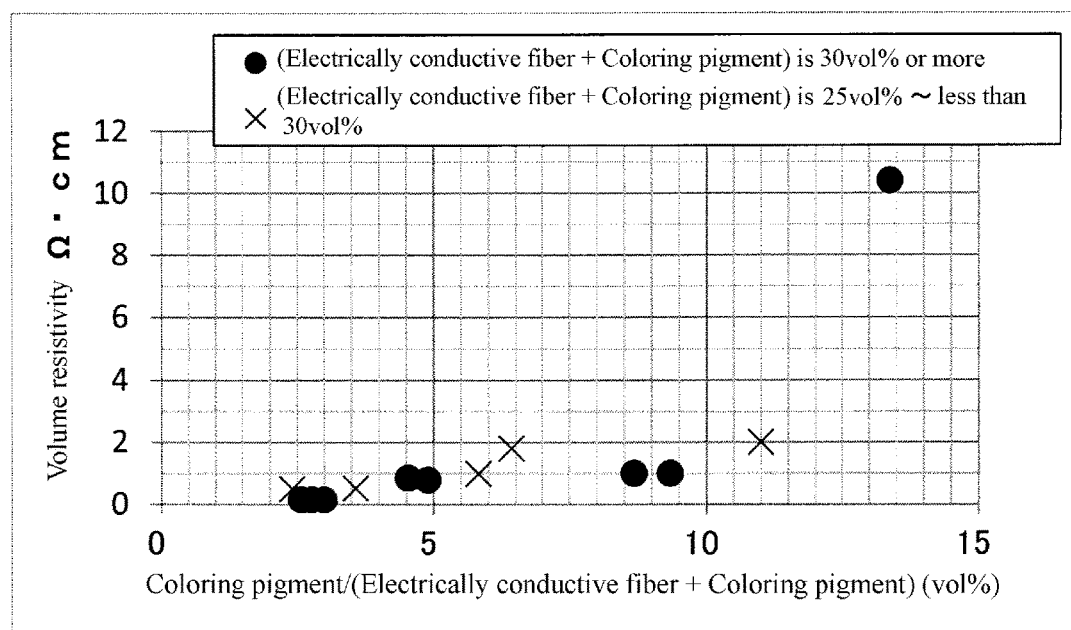
FIG. 2 is a graph showing the relationship between the content percentage of the color pigment relative to the total of electrically conductive fiber and the color pigment and volume resistivity.

FIG. 2 shows a graph where "coloring pigment/(electrically conductive fiber+coloring pigment)" (vol %) in the horizontal axis and the volume resistivity (Ω·cm) in the vertical axis were plotted for each sample. Note that those having a content percentage by volume of the total of the electrically conductive fiber and the coloring pigment of 25 vol % or more and less than 30% are separately shown from those of 30 vol % or more. Further, samples of less than 25 vol % were excluded due to high resistance.

The distribution of the plots in FIG. 2 shows that the volume resistivity sharply increases when the value of "coloring pigment/(electrically conductive fiber+coloring pigment)" is more than 11.0 vol % albeit based on only one point corresponding Sample 10 in terms of a sample size. In Sample 10, the content of the electrically conductive fiber is 27.6 vol %, and the content of the matrix is 69.0 vol %. In contrast, among many samples showing a volume resistivity of 2 Ω·cm or less in FIG. 2, Sample 2 has a content of the electrically conductive fiber of 25.9 vol % and a content of the matrix of 73.6 vol % as shown in the Table. That is, as comparing Sample 2 with Sample 10, Sample 2 shows significantly lower volume resistivity than Sample 10 although Sample 2 has a smaller content of the electrically conductive fiber. This is likely because the content of the coloring pigment, which is smaller than that of the matrix accounting a volume as large as about 70 vol %, has a significantly larger impact on the volume resistivity. This finding could not be obtained if the index "coloring pigment/(electrically conductive fiber+coloring pigment)" were not selected to study the relationship with the volume resistivity.

FIG. 2 further shows that the value of "coloring pigment/(electrically conductive fiber+coloring pigment)" is preferably 11.0 vol % or less at which the volume resistivity is 2 Ω·cm or less, and more preferably 6.0 vol % or less in order to achieve a volume resistivity of 1 Ω·cm or less.

Figure 3:
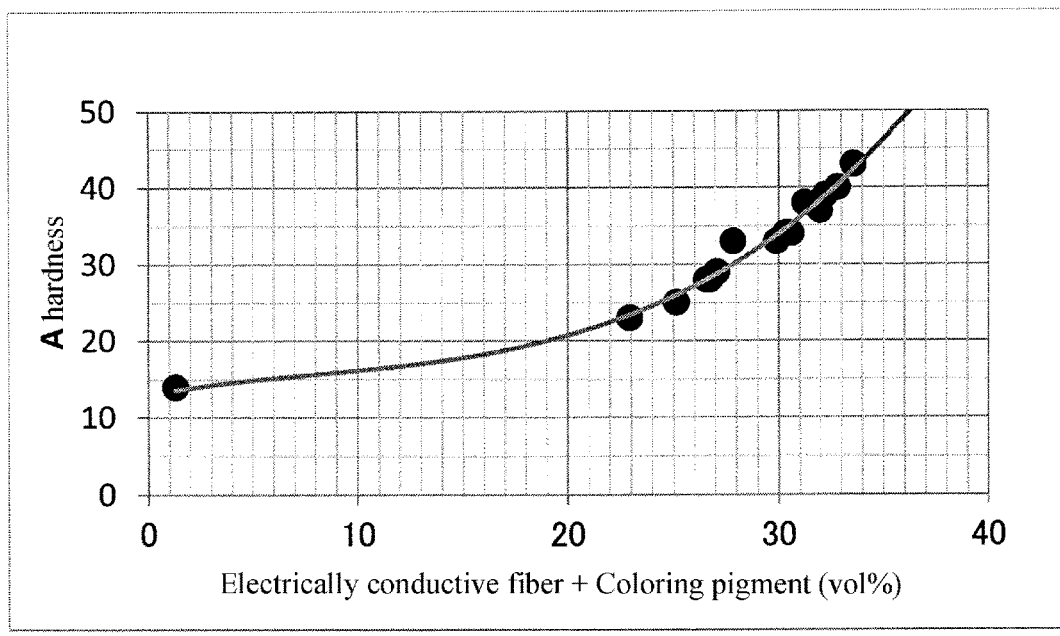
FIG. 3 is a graph showing the relationship between the content percentage of the total of the electrically conductive fiber and the coloring pigment relative to the electrically conductive member and hardness.

FIG. 3 shows a graph where the percentage (vol %) of "electrically conductive fiber+coloring pigment" relative to the entire electrically conductive member in the horizontal axis and the A hardness in the vertical axis are plotted for each sample.

FIG. 3 shows the hardness of the electrically conductive member is dependent on the content of "electrically conductive fiber+coloring pigment." That is, a smaller content of "electrically conductive fiber+coloring pigment" is better in order to further increase flexibility, and a content of "electrically conductive fiber+coloring pigment" of 33 vol % or less is required to achieve A40 or less. Further, the figure also shows that a content of "electrically conductive fiber+coloring pigment" of 31 vol % or less is required to achieve A35 or less, and a content of "electrically conductive fiber+coloring pigment" of 27 vol % or less is required to achieve A30 or less.

Figure 4:
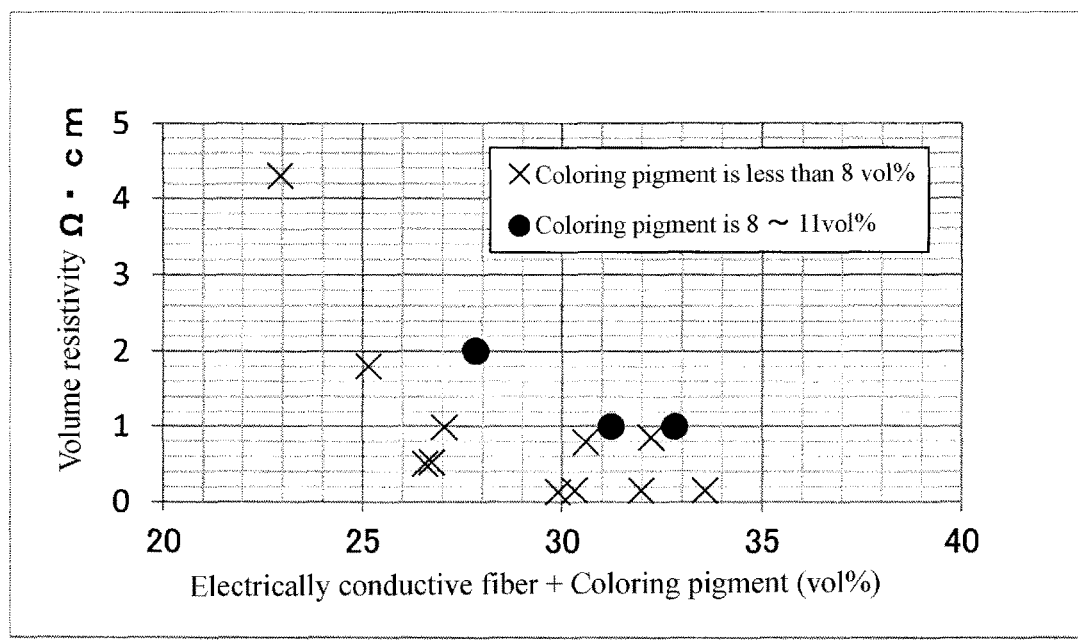
FIG. 4 is a graph showing the relationship between the content percentage of the total of the electrically conductive fiber and the coloring pigment in the electrically conductive member and volume resistivity.

FIG. 4 shows a graph where the percentage (vol %) of "electrically conductive fiber+coloring pigment" relative to the entire electrically conductive member in the horizontal axis and the volume resistivity in the vertical axis are plotted for each sample. Note that those having a content percentage of the coloring pigment relative to "electrically conductive fiber+coloring pigment" of less than 8.0 vol % are here separately shown from those of 8.0 to 11.0 vol %. Further, Sample 10 is excluded because it has very large volume resistivity.

The distribution of the plots in FIG. 4 shows that the volume resistivity sharply increases when "electrically conductive fiber+coloring pigment" is less than 25 vol % albeit based on only one point corresponding to Sample 5 in terms of a sample size. This reveals that the value of "electrically conductive fiber+coloring pigment" is preferably 25 vol % or more at which the volume resistivity is 2 Ω·cm or less, and further more preferably 26 vol % or more in order to achieve a volume resistivity of 1 Ω·cm or less.

What is claimed is:

1. An electrically conductive member, comprising:
   a matrix including a rubber-like elastic body;
   electrically conductive fiber; and
   a coloring pigment,
   wherein the percentage of the coloring pigment is 2.8 to 11.0 vol % relative to the total of the electrically conductive fiber and the coloring pigment,
   wherein the percentage of the total of the electrically conductive fiber and the coloring pigment is 25 to 32.8 vol % relative to the entire electrically conductive member, and
   the matrix is silicone rubber, the electrically conductive fiber is a metal-coated fiber, and the coloring pigment is carbon black.

2. The electrically conductive member according to claim 1, having a volume resistivity of 2 Ω·cm or less, and an A hardness of A40 or less as measured with a type A hardness meter in accordance with Japanese Industrial Standard JIS K6253, and a color difference ΔE of 30 or less, the color difference ΔE being against an ideally colored member formed with the coloring pigment and the matrix with the electrically conductive fiber excluded from the electrically conductive member.

3. The electrically conductive member according to claim 1, wherein the percentage of the coloring pigment is 2.5 to 3.0 vol % relative to the total of the electrically conductive fiber and the coloring pigment, and the volume resistivity is 0.5 Ω·cm or less.

* * * * *

UNITED STATES PATENT AND TRADEMARK OFFICE
CERTIFICATE OF CORRECTION

PATENT NO. : 10,287,406 B2  
APPLICATION NO. : 15/573179  
DATED : May 14, 2019  
INVENTOR(S) : Akihito Takeuchi Page 1 of 1

It is certified that error appears in the above-identified patent and that said Letters Patent is hereby corrected as shown below:

On the Title Page

Please amend Item (73) as follows:  
Assignee: Sekisui Polymatech Co., Ltd., Saitama (JP)

Signed and Sealed this  
Fifth Day of May, 2020

Andrei Iancu  
*Director of the United States Patent and Trademark Office*